United States Patent
Koga et al.

(10) Patent No.: US 10,511,033 B2
(45) Date of Patent: Dec. 17, 2019

(54) SOLID OXIDE FUEL CELL

(71) Applicant: NGK Insulators, Ltd., Nagoya (JP)

(72) Inventors: Koichi Koga, Nagoya (JP); Makoto Ohmori, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 919 days.

(21) Appl. No.: 13/855,074

(22) Filed: Apr. 2, 2013

(65) Prior Publication Data

US 2013/0266889 A1    Oct. 10, 2013

Related U.S. Application Data (60) Provisional application No. 61/621,649, filed on Apr. 9, 2012.

(30) Foreign Application Priority Data

Apr. 6, 2012 (JP) ................. 2012-087465

(51) Int. Cl.
*H01M 8/0236* (2016.01)
*H01M 8/0245* (2016.01)
*H01M 8/124* (2016.01)

(52) U.S. Cl.
CPC ....... *H01M 8/0236* (2013.01); *H01M 8/0245* (2013.01); *H01M 2008/1293* (2013.01)

(58) Field of Classification Search
CPC .......................... H01M 8/0245; H01M 8/0236
See application file for complete search history.

(56) References Cited

U.S. PATENT DOCUMENTS

| | | | | |
|---|---|---|---|---|
| 2002/0098404 A1* | 7/2002 | Shibata | ............... | H01M 4/8642 429/487 |
| 2003/0224240 A1* | 12/2003 | Yamashita | .......... | H01M 8/1226 429/465 |
| 2004/0058225 A1* | 3/2004 | Schmidt | ............. | H01M 4/8621 429/488 |
| 2007/0009784 A1* | 1/2007 | Pal | ..................... | H01M 4/8621 429/432 |

(Continued)

FOREIGN PATENT DOCUMENTS

| JP | 2003288919 A | * 10/2003 |
|---|---|---|
| JP | 2006079831 A | * 3/2006 |
| JP | 4146738 B2 | 9/2008 |

OTHER PUBLICATIONS

Machine Translation of JP 2006079831 A, dated Mar. 23, 2006.*

*Primary Examiner* — Robert S Carrico
(74) *Attorney, Agent, or Firm* — Burr & Brown, PLLC (57) ABSTRACT

An interconnector made of a lanthanum chromite is provided on a fuel electrode of an SOFC, and a P-type semiconductor film which is a conductive ceramics film is formed on a surface of the interconnector. When a maximum value (maximum joining width) of the "lengths of a plurality of portions at which the interconnector and the P-type semiconductor film are brought into contact with each other" on a "line (boundary line) corresponding to an interface between the interconnector and the P-type semiconductor film in a cross section including the interconnector and the P-type semiconductor film" is 40 μm or less, peeling becomes less liable to occur in a portion corresponding to the maximum joining width at the interface.

8 Claims, 5 Drawing Sheets

(56) References Cited

U.S. PATENT DOCUMENTS

2010/0178587 A1\* 7/2010 Inoue .................. H01M 4/8605
                                                    429/495
2010/0196795 A1\* 8/2010 Ohmori ................ H01M 8/021
                                                    429/489
2012/0148934 A1\* 6/2012 Ohmori ............... H01M 8/0236
                                                    429/463
2012/0225368 A1\* 9/2012 Ohmori ............... H01M 4/9033
                                                    429/481

\* cited by examiner

SOLID OXIDE FUEL CELL

BACKGROUND OF THE INVENTION

1. Field of the Invention

The present invention relates to a solid oxide fuel cell.

2. Description of the Related Art (A power generation part of) a solid oxide fuel cell (SOFC) is formed by sequentially laminating a fuel electrode, an electrolyte film formed of a solid electrolyte, and an air electrode. In (the power generation part of) the SOFC, a potential difference between the fuel electrode and the air electrode is generated based on an oxygen potential difference between both surfaces of the electrolyte film by supplying a fuel gas (e.g., hydrogen gas) to the fuel electrode and supplying a gas containing oxygen (e.g., air) to the air electrode.

In the SOFC, an interconnector(s) (conductive connecting member(s) for current collection) is/are generally provided so as to be electrically connected to any one or both of the fuel electrode and the air electrode. Power based on the potential difference is output via the interconnector(s).

With regard to the SOFC provided with an interconnector as described above, Japanese Patent No. 4146738 describes an SOFC in which an interconnector made of dense conductive ceramics is provided on a fuel electrode and a P-type semiconductor film is provided on the surface of the interconnector.

Japanese Patent No. 4146738 describes that, when a P-type semiconductor is provided on the surface of the interconnector made of dense conductive ceramics, a current can be allowed to flow efficiently (i.e., an improvement in conductivity is achieved), although the reason for this is unclear.

SUMMARY OF THE INVENTION

In general, when a "conductive ceramics film such as a P-type semiconductor film or an N-type semiconductor film" is provided on the surface of the interconnector made of dense conductive ceramics, the interconnector made of dense conductive ceramics is first formed by firing, After that, a green compact (film) which is a precursor of a conductive ceramics film is formed on the surface of the dense interconnector. Then, the green compact is fired to form the conductive ceramics film on the surface of the dense interconnector.

When the conductive ceramics film is formed by firing on the surface of the dense interconnector after the dense interconnector is formed, the conductive ceramics film becomes porous. This is considered to be based on the fact that a number of pores are formed in the green compact when a volume of the green compact which is a precursor of the conductive ceramics film formed on the dense layer (which does not shrink during firing of the conductive ceramics film) is reduced due to so-called firing shrinkage (described later in detail). That is, in this case, an interface between the interconnector and the conductive ceramics film serves as a boundary between the dense layer and the porous layer.

The inventors of the present invention paid attention to the "interface between the interconnector and the conductive ceramics film" which becomes a boundary between the dense layer and the porous layer. Then, the inventors of the present invention found a condition under which peeling becomes less liable to occur in a joined state (contact state) of the interface.

That is, it is an object of the present invention to provide an SOFC in which a porous conductive ceramics film is provided on the surface of an interconnector made of dense conductive ceramics provided on a fuel electrode, and peeling is less liable to occur in a joined state of an "interface between the interconnector and the conductive ceramics film."

An SOFC according to the present invention includes: a power generation part of a solid oxide fuel cell, including: a fuel electrode for allowing a fuel gas to be reacted by bringing the fuel gas into contact therewith; an electrolyte film made of a solid electrolyte provided on the fuel electrode; and an air electrode for allowing a gas containing oxygen to be reacted, the air electrode being provided on the electrolyte film so that the electrolyte film is sandwiched between the fuel electrode and the air electrode; an interconnector made of dense conductive ceramics and provided so as to be electrically connected to the fuel electrode; and a porous conductive ceramics film formed on a surface of the interconnector.

In this case, as a material for the interconnector, a lanthanum chromite (LC) is preferred, which is represented by the following chemical formula:

$$La_{1-x}A_xCr_{1-y-z}B_yO_3$$

where A represents at least one kind of element selected from the group consisting of Ca, Sr, and Ba, B represents at least one kind of element selected from the group consisting of Co, Ni, Mg, and Al, a range of x is 0.05 to 0.2, a range of y is 0.02 to 0.22, and a range of z is 0 to 0.05. This is based on the fact that one end (inner side) of the interconnector (terminal electrode) of the fuel electrode is exposed to a reducing atmosphere and the other end (outer side) is exposed to an oxidizing atmosphere. At present, as a conductive ceramics material stable both in the reducing atmosphere and the oxidizing atmosphere, the LC is excellent.

Note that, as the material for the interconnector, a titanium oxide is also preferred, which is represented by the following chemical formula:

$$(A_{1-x}B_x)_{1-z}(Ti_{1-y}D_y)O_3$$

where A represents at least one kind of element selected from the group consisting of alkaline earth elements, B represents at least one kind of element selected from the group consisting of Sc, Y, and lanthanoid elements, D represents at least one kind of element selected from the group consisting of fourth-period, fifth-period, and sixth-period transition metals and Al, Si, Zn, Ga, Ge, Sn, Sb, Pb, and Bi, a range of x is 0 to 0.5, a range of y is 0 to 0.5, and a range of z is −0.05 to 0.05. As the titanium oxide, for example, there may be adopted "strontium titanate (SrTiO$_3$)" using strontium (Sr) as "A." SrTiO$_3$ is also stable both in the reducing atmosphere and the oxidizing atmosphere.

The feature of the SOFC according to the present invention lies in that a maximum value (maximum joining width) of "lengths of a plurality of portions at which the interconnector and the conductive ceramics film are brought into contact with each other" on a "boundary line which is a line corresponding to the interface between the interconnector and the conductive ceramics film in a cross-section including the interconnector and the conductive ceramics film" is 45 μm or less.

As described later, the inventors of the present invention found that peeling is less liable to occur in a "portion corresponding to the maximum joining width at the interface between the interconnector and the conductive ceramics film" when the "maximum joining width" is 45 µm or less, as compared with the case where the "maximum joining width" is larger than 45 µm.

Specifically, when the conductive ceramics film is a P-type semiconductor film, it is preferred that the maximum joining width be 40 µm or less. As a material for the P-type semiconductor film, a transition metal composite oxide having a perovskite-type crystal structure such as lanthanum strontium cobalt ferrite (LSCF) or lanthanum strontium manganite (LSM), or a transition metal composite oxide having a spinel-type crystal structure such as manganese cobaltite ($MnCo_2O_4$) and copper manganite ($CuMn_2O_4$) is preferred.

In this case, it is preferred that a "joining ratio," which is a ratio of a "total of the lengths of a plurality of portions at which the interconnector and the conductive ceramics film (P-type semiconductor film) are brought into contact with each other on the boundary line" with respect to the "length of the boundary line which is a line corresponding to the interface between the interconnector and the conductive ceramics film (P-type semiconductor film) in a cross-section including the interconnector and the conductive ceramics film (P-type semiconductor film)," be 21 to 75%.

On the other hand, when the conductive ceramics film is an N-type semiconductor film, it is preferred that the maximum joining width be 45 µm or less. As a material for the N-type semiconductor film, copper-added lanthanum nickel ferrite ($La(Ni,Fe,Cu)O_3$) is preferred. In this case, it is preferred that the joining ratio be 18 to 65%.

DETAILED DESCRIPTION OF THE INVENTION (Configuration of First Embodiment)

Figure 1:
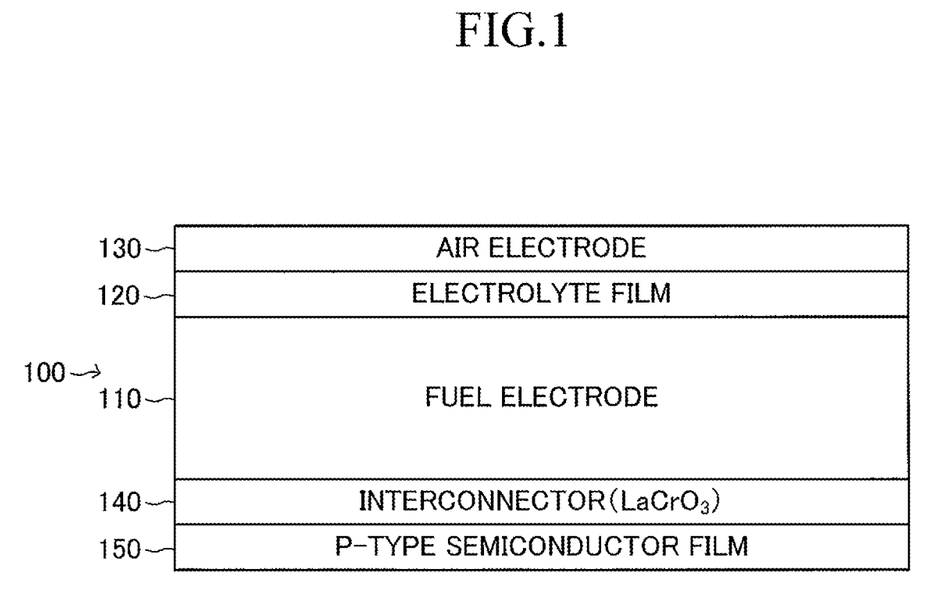
FIG. 1 is a schematic view illustrating a configuration of an SOFC according to a first embodiment of the present invention.

FIG. 1 illustrates a configuration of (a cell of) an SOFC 100 according to a first embodiment of the present invention. The SOFC 100 includes a fuel electrode 110, an electrolyte film 120 laminated on an upper surface of the fuel electrode 110, and an air electrode 130 laminated on an upper surface of the electrolyte film 120. A laminate including the three layers serves as a power generation part of the SOFC 100. Note that, a flow path for allowing a fuel gas to pass therethrough may be provided in the fuel electrode 110.

Further, in the SOFC 100, an interconnector 140 is provided on a lower surface of the fuel electrode 110 so as to be electrically connected (joined) thereto. On a lower surface of the interconnector 140, a conductive film (P-type semiconductor film) 150 made of a P-type semiconductor is formed.

Examples of a shape of the SOFC 100 viewed from above include a square measuring 1 to 30 cm per side, a rectangle having long sides of 5 to 30 cm and short sides of 3 to 15 cm, or a circle having a diameter of 1 to 30 cm. The total thickness of the SOFC 100 is 0.1 to 3 mm. The interconnector 140 may be provided on the entire lower surface of the fuel electrode 110 or provided only on a part of the lower surface of the fuel electrode 110. Further, the P-type semiconductor film 150 may be provided on the entire lower surface of the interconnector 140 or provided only on a part of the lower surface of the interconnector 140. Further, an interconnector may be provided on an upper surface of the air electrode 130.

The fuel electrode 110 (anode electrode) is a porous thin-plate-like fired body formed of nickel oxide (NiO) and/or nickel (Ni) and yttria-stabilized zirconia (YSZ). The fuel electrode 110 has a thickness of 0.1 to 3 mm. The thickness of the fuel electrode 110 is largest of the thicknesses of respective constituent members of the SOFC 100, and the fuel electrode 110 functions as a support (support substrate, member having the largest stiffness) of the SOFC 100.

Noted that, the fuel electrode 110 (anode electrode) may be formed of nickel oxide (NiO) and/or nickel (Ni) and yttria ($Y_2O_3$). In addition, the fuel electrode 110 may be formed of two layers including a fuel-electrode current-collecting layer (interconnector side) and a fuel-electrode active layer (electrolyte film side). In this case, the fuel-electrode active portion may be formed of, for example, nickel oxide (NiO) and yttria-stabilized zirconia (YSZ) (8YSZ), or may be formed of nickel oxide (NiO) and gadolinium-doped ceria (GDC). The fuel-electrode current-collecting portion may be formed of, for example, nickel oxide (NiO) and yttria-stabilized zirconia (YSZ) (8YSZ), nickel oxide (NiO) and yttria ($Y_2O_3$), or nickel oxide (NiO) and calcia-stabilized zirconia (CSZ). The fuel-electrode active portion has a thickness of 5 to 30 µm, and the fuel-electrode current-collecting portion has a thickness of 50 to 500 µm.

As described above, the fuel-electrode current-collecting portion includes a substance having electron conductivity. The fuel-electrode active portion includes a substance having electron conductivity and a substance having oxygen ion conductivity. The "volume ratio of the substance having oxygen ion conductivity relative to the total volume excluding pores" in the fuel-electrode active portion is larger than the "volume ratio of the substance having oxygen ion conductivity relative to the total volume excluding pores" in the fuel-electrode current-collecting portion.

The electrolyte film 120 is a dense thin-plate-like fired body formed of YSZ. The electrolyte film 120 has a thickness of 3 to 30 µm.

The air electrode 130 (cathode electrode) is a porous thin-plate-like fired body formed of lanthanum strontium cobalt ferrite (LSCF) ($La_{0.6}Sr_{0.4}Co_{0.2}Fe_{0.8}O_3$). The air electrode 130 has a thickness of 5 to 50 µm. The air electrode 130 may be formed of two layers including a first layer (electrolyte film side) formed of LSCF and a second layer (layer laminated on the upper surface of the first layer) formed of lanthanum strontium cobaltite (LSC) ($La_{0.8}Sr_{0.2}CoO_3$).

In order to prevent the occurrence of a phenomenon in which YSZ in the electrolyte film 120 and strontium in the air electrode 130 react with each other during production of an SOFC or in the SOFC 100 which is being operated to increase electric resistance between the electrolyte film 120 and the air electrode 130, a reaction prevention layer may be inserted between the electrolyte film 120 and the air electrode 130. It is preferred that the reaction prevention layer be a dense thin-plate-like fired body made of ceria. Specific examples of the ceria include gadolinium-doped ceria (GDC) and samarium-doped ceria (SDC).

The interconnector 140 is a dense thin-plate-like conductive connecting member made of conductive ceramics. The interconnector 140 has a thickness of 1 to 100 μm. The interconnector 140 has a porosity of 5% or less. As the conductive ceramics, for example, a lanthanum chromite (LC) represented by the following chemical formula (1) is adopted. In the chemical formula (1), A represents at least one kind of element selected from the group consisting of Ca, Sr, and Ba, and B represents at least one kind of element selected from the group consisting of Co, Ni, Mg, and Al. A range of x is 0.05 to 0.2; a range of y is 0.02 to 0.22, and a range of z is 0 to 0.05. δ represents a minute value including 0.

$$La_{1-x}A_xCr_{1-y-z}B_yO_{3-\delta} \quad (1)$$

The P-type semiconductor film 150 is a porous thin-plate-like conductive film made of a P-type semiconductor. The P-type semiconductor film 150 has a thickness of 1 to 100 μm. The P-type semiconductor film has a porosity of 20 to 50%. As the P-type semiconductor, for example, LSCF, LSC, or LSM which is the same material as that for the air electrode 130 is adopted. Note that, as long as the P-type semiconductor film 150 contains 50% by volume or more of P-type semiconductor material, an insulating material (for example, glass) for improving a sintering property, a noble metal material (for example, platinum) for improving conductivity, or the like may be added to the P-type semiconductor film 150.

By supplying a fuel gas (hydrogen gas, etc.) to the fuel electrode 110 and supplying a gas (air, etc.) containing oxygen to the air electrode 130 in the SOFC 100, chemical reactions represented by the following chemical formulae (2) and (3) occur. Consequently, a potential difference is generated between the fuel electrode 110 and the air electrode 130. The potential difference is based on an oxygen potential difference between both surfaces of the electrolyte film 120.

$$(1/2)^- O_2 + 2e^- \rightarrow O^{2-} \text{ (at the air electrode 130)} \quad (2)$$

$$H_2 + O^{2-} \rightarrow H_2O + 2e^- \text{ (at the fuel electrode 110)} \quad (3)$$

Owing to the potential difference, in the SOFC 100, a current flows in the direction of P-type semiconductor film 150→interconnector (LC) 140→fuel electrode 110→electrolyte film 120→air electrode 130→(electron flows in the direction of air electrode 130→electrolyte film 120→fuel electrode 110→interconnector (LC) 140→P-type semiconductor film 150). Then, power based on the potential difference is taken out of the SOFC 100 via the interconnector (LC) 140 (and an interconnector (not shown) provided on the air electrode 130).

In the first embodiment, the porosity of a film was measured as follows (the same also applies to a second embodiment described later). First, so-called "resin embedding" treatment was performed with respect to a film so that a resin entered pores of the film. The surface of the film subjected to the "resin embedding" was mechanically polished. An image obtained by observing a microstructure of the mechanically polished surface with a scanning electron microscope was subjected to image processing to calculate respective areas of a pore portion (portion in which the resin has entered) and a non-pore portion (portion in which the resin has not entered). The ratio between the areas was defined as a porosity of the film.

(Production Method)

Next, an example of a method of producing the SOFC 100 illustrated in FIG. 1 is described.

First, a precursor (before firing) of the fuel electrode 110 was formed as follows. That is, NiO powder and YSZ power were mixed, and polyvinyl alcohol (PVA) was added as a binder to the mixture to produce slurry. The slurry was dried and granulated with a spray dryer to obtain powder for a fuel electrode. The power was compacted by a die press forming method to form the precursor of the fuel electrode 110.

Next, a precursor (before firing) of the electrolyte film 120 was formed on an upper surface of the precursor of the fuel electrode 110 as follows. That is, water and a binder were added to YSZ powder, and the mixture was mixed with a ball mill for 24 hours to produce slurry. The slurry was applied to and dried on the upper surface of the precursor of the fuel electrode 110 to form the precursor (film) of the electrolyte film 120. Note that, when the precursor (film) of the electrolyte film 120 is formed on the upper surface of the precursor of the fuel electrode 110, a tape lamination process, a printing process, or the like may be used.

Next, a precursor (before firing) of the interconnector 140 was formed on a lower surface of the precursor of the fuel electrode 110 through use of lanthanum chromite powder by a printing process, a tape lamination process, a slurry dipping process, a plasma spraying process, or an aerosol deposition process.

Consequently, a laminate (before firing) including three layers of the precursor of the fuel electrode 110, the precursor of the electrolyte film 120, and the precursor of the interconnector 140 was formed. The laminate (before firing) was co-sintered at 1,300 to 1,600° C. for 2 hours to obtain a laminate (after firing) including three layers of the porous fuel electrode 110, the dense electrolyte film 120, and the dense interconnector 140.

Next, the air electrode 130 was formed on an upper surface of the electrolyte film 120 of the laminate as follows. That is, water and a binder were added to LSCF powder, and the mixture was mixed with a ball mill for 24 hours to produce slurry. The slurry was applied to and dried on the upper surface of the electrolyte film 120 and fired at 1,000° C. for 1 hour in air with an electronic furnace (in an atmosphere containing oxygen). Thus, the porous air electrode 130 was formed on the upper surface of the electrolyte film 120.

Next, the P-type semiconductor film 150 was formed on a lower surface of the interconnector 140 as follows. That is, water and a binder were added to LSCF powder, and the mixture was mixed with a ball mill for 24 hours to produce slurry. The slurry was used to form a film on the lower surface of the interconnector 140 by a spray process or the like. The film was fired at 1,000 to 1,400° C. for 2 hours to form the porous P-type semiconductor film 150 on the lower surface of the interconnector 140.

As a method of forming the P-type semiconductor film, a printing process, a tape lamination process, or a slurry dipping process can also be applied. Note that, in the case where the P-type semiconductor film is fired at the same temperature as that for firing the air electrode, the P-type semiconductor film and the air electrode may be fired simultaneously. Further, in the case where the P-type semiconductor film is fired at a temperature higher than that for firing the air electrode, the P-type semiconductor film may be fired before the air electrode is fired or may be fired simultaneously with the firing of the interconnector.

In the case where the P-type semiconductor film is formed by firing on the surface of the interconnector made of dense conductive ceramics after the interconnector is formed (completed), the P-type semiconductor film becomes porous. The reason for this is considered as follows. That is, when the slurry (green compact) serving as the precursor of the P-type semiconductor film is fired, the green compact (before firing) attempts to shrink due to so-called firing shrinkage, while the dense layer (interconnector) which has already been fired does not shrink. That is, while the entire volume of the green compact attempts to decrease, the reduction in size in a planar direction (direction along an interface between the green compact and the dense layer) is prevented due to a so-called anchor effect in a portion in the vicinity of the interface. Consequently, a number of pores are formed in the green compact. That is, the P-type semiconductor film which is a fired body becomes porous. The interface between the interconnector 140 and the P-type semiconductor film 150 serves as a boundary between the dense layer and the porous layer.

Accordingly, lamination of members forming the SOFC 100 is completed. In this case, it is necessary that the fuel electrode 110 have conductivity. Therefore, the fuel electrode 110 (fired body) after firing is subjected to heat treatment (reducing treatment) of supplying a reducing gas at a high temperature of 800° C. Owing to the reducing treatment, MO is reduced to Ni, and the fuel electrode 110 acquires conductivity. An example of the method of producing the SOFC 100 illustrated in FIG. 1 is as described above.

In the following, a procedure for determining whether a material is a P-type semiconductor or an N-type semiconductor is additionally described. The determination is performed based on a Seebeck coefficient. In general, a material having a positive Seebeck coefficient can be determined as a P-type semiconductor, and a material having a negative Seebeck coefficient can be determined as an N-type semiconductor.

Specifically, for example, the following determination is performed. First, powder as a material is compacted through use of a uniaxial press, and the compact thus obtained is fired at 1,400° C. for 2 hours to obtain a sintered body. A test chip of Φ3.0 mm and L of 10 mm is produced from the resultant sintered body and measured for a Seebeck coefficient through use of a ZME-3 series evaluation apparatus manufactured by Ulvac-Riko Inc. The measurement is performed, for example, at 750° C. in an atmosphere of an inert gas. As a result of the measurement, the test chip having a positive Seebeck coefficient can be determined as a P-type semiconductor, and the test chip having a negative Seebeck coefficient can be determined as an N-type semiconductor. The above-mentioned P-type semiconductor film 150 has a positive Seebeck coefficient.

(Interface Between Interconnector and P-Type Semiconductor Film)

Figure 2:
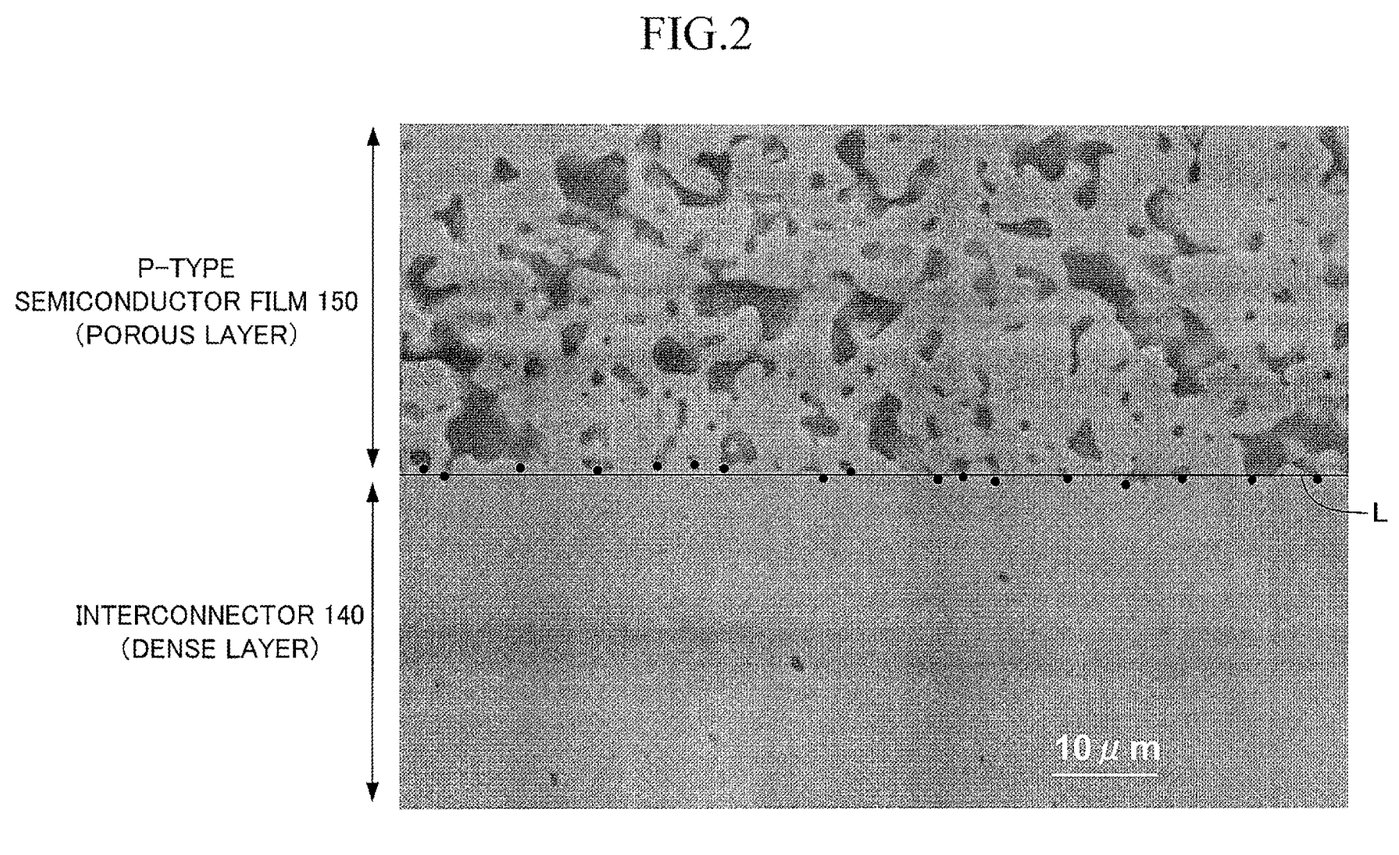
FIG. 2 is an image obtained by magnifying a cross-section including an interconnector and a P-type semiconductor film according to the first embodiment of the present invention by 1,000 times with an electron microscope, illustrating a "joining ratio" and a "joined width;"

In the following, an interface between the interconnector 140 and the P-type semiconductor film 150, that is, a boundary between the dense layer and the porous layer is paid attention to. FIG. 2 shows a state obtained by observing a cross-section including the interconnector 140 and the P-type semiconductor film 150 (cross-section along a lamination direction, cross-section vertical to a planar direction of each element (each film)) according to the first embodiment of the present invention, magnified by 1,000 times with an electron microscope.

In the present specification, a line (line segment L in the example shown in FIG. 2) corresponding to the interface between the interconnector 140 (dense layer) and the P-type semiconductor film 150 (porous layer) in the cross-section is referred to as a "boundary line." The boundary line can be defined, for example, as follows. That is, on the cross-section, a plurality of pores present while facing the dense layer are extracted from a number of pores included in the porous layer. Regarding each of the plurality of pores thus extracted, points closest to the dense layer side in regions corresponding to the pores (points on the lowermost side in the regions corresponding to the pores in the example shown in FIG. 2) are plotted (see a plurality of black dots in the example shown in FIG. 2). A line (straight line or curve) passing through the vicinity of each of the plurality of plotted points is determined through use of the plurality of plotted points and one of well-known statistical procedures (for example, a least-squares method). The determined line (line segment L in the example shown in FIG. 2) becomes the "boundary line." In the example shown in FIG. 2, the interconnector 140 has a plate shape, and hence, the "boundary line" is a straight line. However, for example, in the case where the interconnector 140 is warped or curved, the "boundary line" becomes a curve. Further, the "boundary line" may be formed of a combination of a straight line and a curve.

Regarding the "boundary line" thus defined, a "joining ratio" and a "maximum joining width" are defined as follows. The "joining ratio" is defined as a ratio of a total of the lengths of a "plurality of portions" (plurality of portions not corresponding to the pores) where the interconnector 140 and the P-type semiconductor film 150 are brought into contact with each other on the "boundary line" with respect to the length (length of the line segment L in the example shown in FIG. 2) of the "boundary line." The "maximum joining width" is defined as a maximum value of the lengths of the "plurality of portions."

Figure 3:
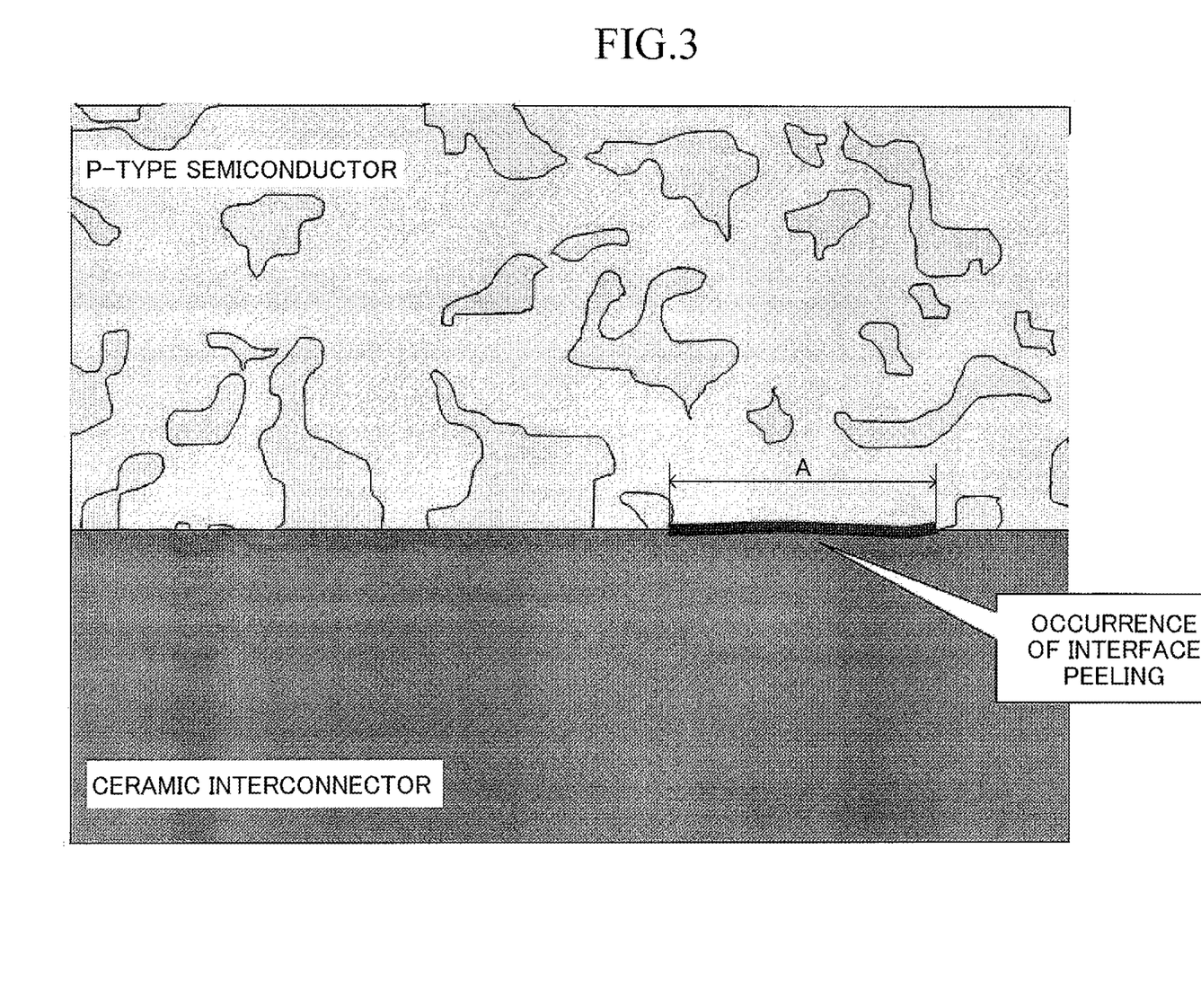
FIG. 3 is a diagram illustrating a state in which peeling occurs at an interface between the interconnector and the P-type semiconductor film in the cross-section including the interconnector and the P-type semiconductor film.

The inventors of the present invention found that, in the first embodiment, peeling is less liable to occur in the "portion corresponding to the maximum joining width at the interface between the interconnector and the P-type semiconductor film" in the case where the "maximum joining width" is 40 μm or less, as compared with the case where the "maximum joining width" is larger than 40 μm. FIG. 3 is a schematic diagram illustrating a state in which peeling is occurring in the portion corresponding to a maximum joining width A at the interface due to the fact that the maximum joining width A is larger than 40 μm. In the following, a test A confirming this finding is described.

(Test A)

In the test A, a plurality of samples of a joined body of the interconnector and the P-type semiconductor film corresponding to parts of the SOFC according to the first embodiment of the present invention (hereinafter referred to as "joined body") were produced with a varying combination of a material for the interconnector, a material for the P-type semiconductor film, and the "joining ratio." Specifically, as shown in Table 1, 18 kinds of levels (combinations) were prepared. 20 samples (N=20) were produced with respect to each level.

TABLE 1

| Level | Material for interconnector | Material for P-type semiconductor film | Joining ratio [%] | Maximum joining width [µm] | Evaluation result |
|---|---|---|---|---|---|
| 1 | LC | LSM | 22 | 5 | ○ (No peeling) |
| 2 | LC | LSM | 37 | 15 | ○ (No peeling) |
| 3 | LC | LSM | 43 | 26 | ○ (No peeling) |
| 4 | LC | LSM | 56 | 33 | ○ (No peeling) |
| 5 | LC | LSM | 64 | 40 | ○ (No peeling) |
| 6 | LC | LSM | 73 | 45 | x (2/20 Occurrence of peeling) |
| 7 | LC | LSCF | 21 | 16 | ○ (No peeling) |
| 8 | LC | LSCF | 38 | 20 | ○ (No peeling) |
| 9 | LC | LSCF | 45 | 26 | ○ (No peeling) |
| 10 | LC | LSCF | 62 | 36 | ○ (No peeling) |
| 11 | LC | LSCF | 68 | 48 | x (3/20 Occurrence of peeling) |
| 12 | LC | LSCF | 75 | 52 | x (3/20 Occurrence of peeling) |
| 13 | LC | $MnCo_2O_4$ | 23 | 12 | ○ (No peeling) |
| 14 | LC | $MnCo_2O_4$ | 26 | 18 | ○ (No peeling) |
| 15 | LC | $MnCo_2O_4$ | 33 | 25 | ○ (No peeling) |
| 16 | LC | $MnCo_2O_4$ | 42 | 35 | ○ (No peeling) |
| 17 | LC | $MnCo_2O_4$ | 46 | 40 | ○ (No peeling) |
| 18 | LC | $MnCo_2O_4$ | 63 | 60 | x (5/20 Occurrence of peeling) |

As each sample (joined body), a laminate was used in which an interconnector having a circular shape (diameter: about 2 cm) when viewed from above and a thickness of about 1 mm, and a P-type semiconductor film having a circular shape (diameter: about 1 cm) when viewed from above and a thickness of about 100 µm were laminated. Each sample (joined body) was produced by forming the P-type semiconductor film by firing on a surface of the interconnector which had already been completed by firing. The "joining ratio" and "maximum joining width" were adjusted by adjusting a particle diameter and a specific surface area of powder (LSCF powder, etc.) to be used for firing the P-type semiconductor film, the amounts of organic components (a binder, a pore forming material), the firing temperature of the P-type semiconductor film, and the like.

Specifically, the average particle diameter of the powder was adjusted in a range of 0.5 to 5 µm. The specific surface area of the powder was adjusted in a range of 3 to 30 $m^2/g$. The amounts (weight) of the organic components were adjusted in a range of 10 to 50% with respect to the total weight of the powder. As the pore forming material, cellulose, carbon, PMMA, or the like was used. The firing temperature was adjusted in a range of 850 to 1,300° C. The firing time was adjusted in a range of 1 to 20 hours.

In the levels 13 to 18, as a material for the P-type semiconductor film, a transition metal composite oxide ($MnCo_2O_4$) having a spinel-type crystal structure is used. For firing the materials, each powder of two kinds of metal elements (Mn, Co) forming a spinel-based material was used as a starting material, and the powder was oxidized during firing, to thereby form the transition metal composite oxide having a spinet-type crystal structure.

Then, regarding each sample (joined and fired body), the presence/absence of peeling at the interface between the interconnector and the P-type semiconductor film was checked. The presence/absence of peeling was checked for each sample by observing the "cross-section including the interconnector and the P-type semiconductor film" used for measuring the "joining ratio" and the "maximum joining width" with naked eyes and through use of an optical microscope.

As is understood from Table 1, when the "maximum joining width" is larger than 40 µm, peeling is liable to occur in a portion corresponding to the maximum joining width at the interface. On the other hand, when the "maximum joining width" is 40 µm or less, peeling is less liable to occur in the portion corresponding to the maximum joining width at the interface. The reason for this is not clear but is considered as follows.

That is, in the first embodiment, as described above, a green compact (before firing) which is a precursor of the P-type semiconductor film is formed on the interconnector (after firing), and the green compact is fired to form the P-type semiconductor film (after firing) on the interconnector (after firing). When the green compact is fired, the green compact attempts to shrink due to so-called firing shrinkage, while the interconnector which has already been fired does not shrink. Consequently, in a region of the green compact in the vicinity of the interface between the green compact and the interconnector, the reduction in size of the green compact in a planar direction (direction along the interface) is prevented due to a so-called anchor effect. In other words, in the region of the green compact in the vicinity of the interface, the sintering of the green compact proceeds while the region is greatly distorted (receiving large tension stress). At this time, when a portion whose restrained width (that is, a joined width) in the planar direction caused by the anchor effect is larger than a certain value is present in the region, it is considered that the distortion (tension stress) is released along with the phenomenon "peeling" in that portion.

Table 1 shows the results obtained when the "joining ratio" is in a range of 21 to 75%. From such a viewpoint, it can also be considered that peeling is less liable to occur in the portion corresponding to the maximum joining width at the interface in the case where the "joining ratio" is 21 to 75% and the "maximum joining width" is 40 µm or less. Note that, the following has been separately confirmed: when the "joining ratio" is 21 to 75%, the tension strength at the interface is larger than that in the case where the "joining ratio" is not 21 to 75%.

In the test A (Table 1), although only the lanthanum chromite (LC) is used as the material for the interconnector, it has been confirmed that the same results as those in the case of using the LC are obtained also in the case of using the "titanium oxide" described in the section of "SUMMARY OF THE INVENTION." In addition, although only $MnCo_2O_4$ is used as the "transition metal composite oxide having a spinel-type crystal structure" as the material or the P-type semiconductor film, it has been confirmed that the same results as those in the case of using $MnCo_2O_4$ are obtained also in the case of using $CuMn_2O_4$.

From the above-mentioned contents and the results of Table 1, the following can be said: specifically, in the case where the LC or titanium oxide is used as the material for the interconnector, and the "transition metal composite oxide having a perovskite-type crystal structure" such as LSM and LSCF or the "transition metal composite oxide having a spinel-type crystal structure" such as $MnCo_2O_4$ and $CuMn_2O_4$ is used as the material for the P-type semiconductor film, when the "joining ratio" is 21 to 75% and the "maximum joining width" is 40 µm or less, peeling is less liable to occur in the portion corresponding to the maximum joining width at the interface.

Note that, the present invention is not limited to the first embodiment, and various modified examples can be adopted within the scope of the present invention. For example, in the first embodiment, although a flow path for a fuel gas is not formed in the fuel electrode 110, the flow path for the fuel gas may be formed in the fuel electrode 110. In addition, although the laminate forming the SOFC 100 is present alone (see FIG. 1), the laminate may be present as a part of the entire apparatus.

Further, it is sufficient that the "maximum joining width be 40 μm or less" (and the joining ratio be 21 to 75%) only in any one cross-section including the interconnector and the P-type semiconductor film. Alternatively, it is necessary that the "maximum joining width be 40 μm or less" (and the joining ratio be 21 to 75%) in any plurality of cross-sections including the interconnector and the P-type semiconductor film (for example, two cross-sections parallel to a certain direction and two cross-sections parallel to a direction orthogonal to the certain direction).

(Second Embodiment)

Figure 4:
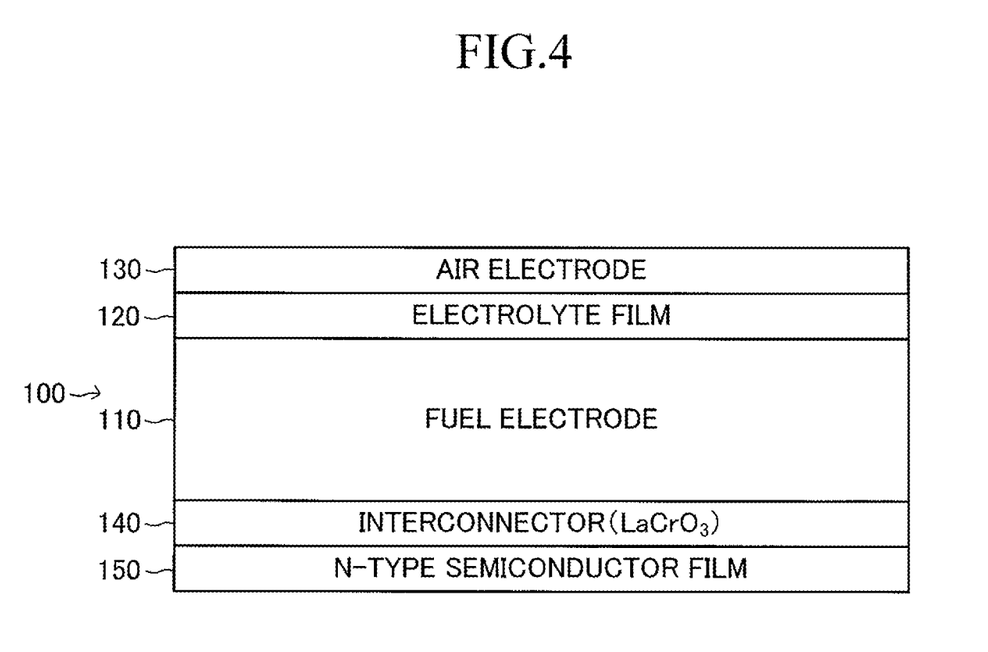
FIG. 4 is a view corresponding to FIG. 1 according to a second embodiment of the present invention.
Figure 5:
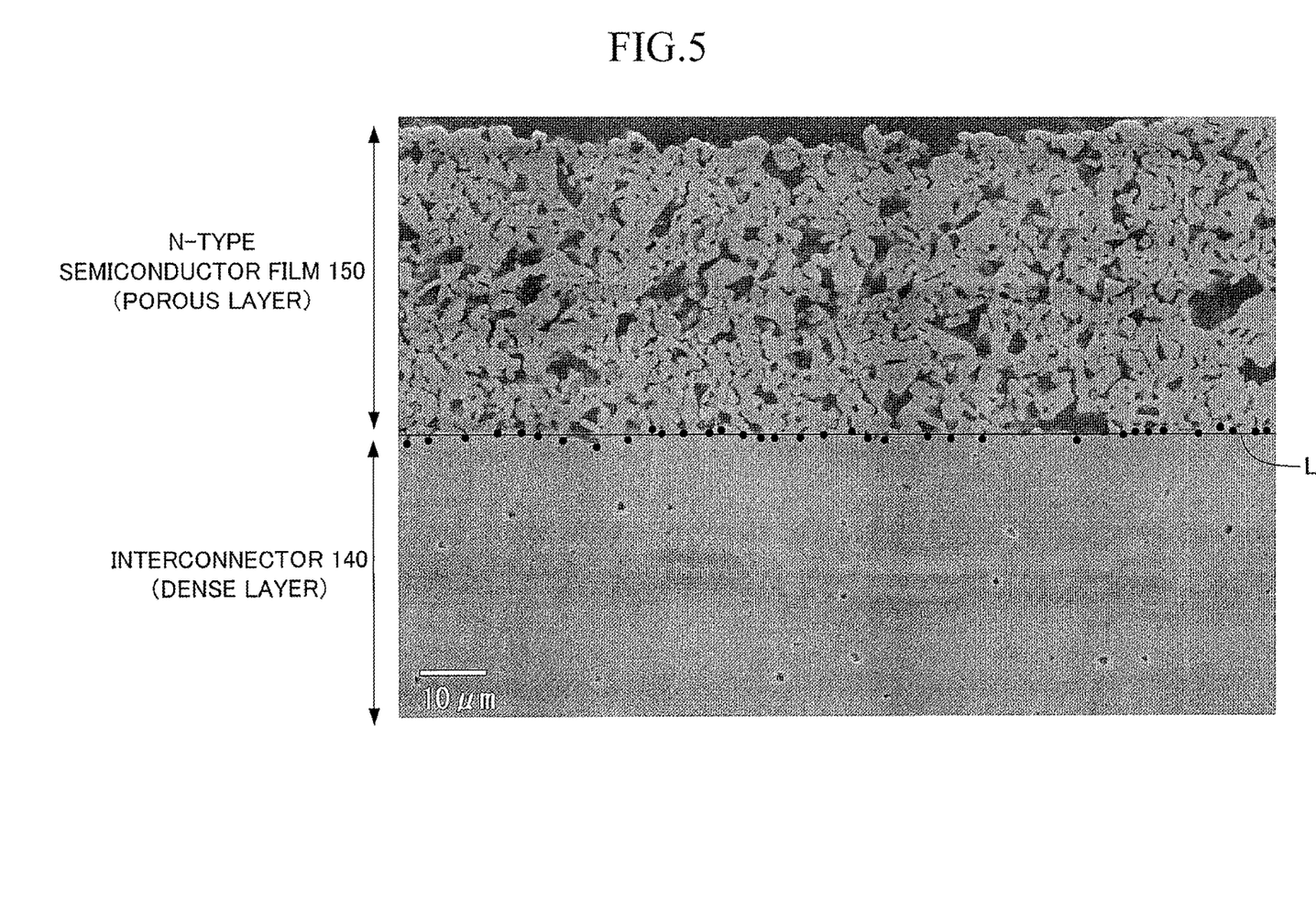
FIG. 5 is an image corresponding to FIG. 2 according to the second embodiment of the present invention.

Next, (a cell of) an SOFC 100 according to a second embodiment of the present invention is described with reference to FIGS. 4 and 5. As is understood from the comparison between FIGS. 1 and 4, the second embodiment is different from "the first embodiment in which the P-type semiconductor film 150 is formed on the lower surface of the interconnector 140" in that a conductive film (N-type semiconductor film) 150 made of an N-type semiconductor is formed on the lower surface of the interconnector 140. In the following, the difference is mainly described.

In the SOFC 100 of the second embodiment, the N-type semiconductor film 150 (see FIG. 4) formed on the lower surface of the interconnector 140 is a porous thin-plate-like conductive film made of an N-type semiconductor. The N-type semiconductor film 150 has a thickness of 1 to 100 μm. The N-type semiconductor film has a porosity of 20 to 50%. As the N-type semiconductor, for example, copper-added lanthanum nickel ferrite (La(Ni,Fe,Cu)O$_3$) or the like is adopted. Note that, as long as the N-type semiconductor film 150 contains 50% by volume or more of N-type semiconductor material, an insulating material (for example, glass) for improving a sintering property, a noble metal material (for example, platinum) for improving conductivity, or the like may be added to the N-type semiconductor film 150.

Also in the second embodiment, similarly to the first embodiment, a current flows in the direction of N-type semiconductor film 150→interconnector (LC) 140→fuel electrode 110→electrolyte film 120→air electrode 130 (electron flows in the direction of air electrode 130→electrolyte film 120→fuel electrode 110→interconnector (LC) 140→N-type semiconductor film 150).

The N-type semiconductor film 150 was formed on the lower surface of the interconnector 140 as follows. That is, water and a binder were added to La(Ni,Fe,Cu)O$_3$ powder, and the mixture was mixed with a ball mill for 24 hours to produce slurry. The slurry was used to form a film on the lower surface of the interconnector 140 by a spray process or the like. The film was fired at 1,000 to 1,400° C. for 2 hours to form the porous N-type semiconductor film 150 on the lower surface of the interconnector 140.

As a method of forming the N-type semiconductor film, a printing process, a tape lamination process, or a slurry dipping process can also be applied. Note that, in the case where the N-type semiconductor film is fired at the same temperature as that for firing the air electrode, the N-type semiconductor film and the air electrode may be fired simultaneously. Further, in the case where the N-type semiconductor film is fired at a temperature higher than that for firing the air electrode, the N-type semiconductor film may be fired before the air electrode is fired or may be fired simultaneously with the firing of the interconnector.

In the case where the N-type semiconductor film is formed by firing on the surface of the interconnector made of dense conductive ceramics after the interconnector is formed (completed), the N-type semiconductor film becomes porous. The reason for this is the same as that in the case of the P-type semiconductor film 150 of the first embodiment. Therefore, the interface between the interconnector 140 and the N-type semiconductor film 150 serves as a boundary between the dense layer and the porous layer.

(Interface Between Interconnector and N-type Semiconductor Film in Second Embodiment)

In the following, in the same way as in the first embodiment, an interface between the interconnector 140 and the N-type semiconductor film 150, that is, a boundary between the dense layer and the porous layer in the second embodiment is paid attention to. FIG. 5 is an image corresponding to FIG. 2, illustrating a state obtained by observing a cross-section including the interconnector 140 and the N-type semiconductor film 150 (cross-section along a lamination direction, cross-section vertical to a planar direction of each element (each film)) according to the second embodiment of the present invention, magnified by 1,000 times with an electron microscope. Also in the second embodiment, a "boundary line" (line segment L in the example shown in FIG. 5), and a "joining ratio" and a "maximum joining width" are defined by the same procedure as that of the first embodiment.

The inventors of the present invention found that, in the second embodiment, peeling is less liable to occur in the "portion corresponding to the maximum joining width at the interface between the interconnector and the N-type semiconductor film" in the case where the "maximum joining width" is 45 μm or less, as compared with the case where the "maximum joining width" is larger than 45 μm. In the following, a test B confirming this finding is described.

(Test B)

In the test B, a plurality of samples of a joined body of the interconnector and the N-type semiconductor film corresponding to parts of the SOFC according to the second embodiment (hereinafter referred to as "joined body") were produced with a varying combination of a material for the interconnector, a material for the N-type semiconductor film, and the "joining ratio." Specifically, as shown in Table 2, 10 kinds of levels (combinations) were prepared. 20 samples (N=20) were produced with respect to each level. Note that, in the column of "Material for N-type semiconductor film" in Table 2, "LNFC" represents La(Ni,Fe,Cu)O$_3$,

TABLE 2

| Level | Material for interconnector | Material for N-type semiconductor film | Joining ratio [%] | Maximum joining width [μm] | Evaluation result |
|---|---|---|---|---|---|
| 19 | LC | LNCF | 18 | 3.6 | ○ (No peeling) |
| 20 | LC | LNCF | 26 | 13 | ○ (No peeling) |
| 21 | LC | LNCF | 35 | 16 | ○ (No peeling) |
| 22 | LC | LNCF | 42 | 24 | ○ (No peeling) |
| 23 | LC | LNCF | 53 | 32 | ○ (No peeling) |
| 24 | LC | LNCF | 65 | 45 | ○ (No peeling) |
| 25 | LC | LNCF | 54 | 51 | x (3/20 Occurrence of peeling) |

TABLE 2-continued

| Level | Material for inter- con- nector | Material for N-type semi- conductor film | Joining ratio [%] | Maximum joining width [μm] | Evaluation result |
|---|---|---|---|---|---|
| 26 | LC | LNCF | 48 | 58 | x (4/20 Occurrence of peeling) |
| 27 | LC | LNCF | 30 | 36 | ○ (No peeling) |
| 28 | LC | LNCF | 23 | 18 | ○ (No peeling) |

As each sample (joined body), a laminate was used in which an interconnector having a circular shape (diameter: about 2 cm) when viewed from above and a thickness of about 1 mm, and an N-type semiconductor film having a circular shape (diameter: about 1 cm) when viewed from above and a thickness of about 100 μm were laminated. Each sample (joined body) was produced by forming the N-type semiconductor film by firing on a surface of the interconnector which had already been completed by firing. The "joining ratio" and "maximum joining width" were adjusted by adjusting a particle diameter and a specific surface area of powder (La(Ni,Fe,Cu)O$_3$ powder, etc.) to be used for firing the N-type semiconductor film, the amounts of organic components (a binder, a pore forming material), the firing temperature of the N-type semiconductor film, and the like.

Specifically, the average particle diameter of the powder was adjusted in a range of 0.5 to 5 μm. The specific surface area of the powder was adjusted in a range of 3 to 30 m$^2$/g. The amounts (weight) of the organic components were adjusted in a range of 10 to 50% with respect to the total weight of the powder. As the pore forming material, cellulose, carbon, PMMA, or the like was used. The firing temperature was adjusted in a range of 1,000 to 1,300° C. The firing time was adjusted in a range of 1 to 20 hours.

Then, regarding each sample (joined and fired body), the presence/absence of peeling at the interface between the interconnector and the N-type semiconductor film was checked. The presence/absence of peeling was checked for each sample by observing the "cross-section including the interconnector and the N-type semiconductor film" used for measuring the "joining ratio" and the "maximum joining width" with naked eyes and through use of an optical microscope.

As is understood from Table 2, when the "maximum joining width" is larger than 45 μm, peeling is liable to occur in a portion corresponding to the maximum joining width at the interface. On the other hand, when the "maximum joining width" is 45 μm or less, peeling is less liable to occur in the portion corresponding to the maximum joining width at the interface. The reason for this is not clear but is considered to be the same as that in the case of peeling occurring in the first embodiment described above.

Table 2 shows the results obtained when the "joining ratio" is in a range of 18 to 65%. From such a viewpoint, it can also be considered that peeling is less liable to occur in the portion corresponding to the maximum joining width at the interface in the case where the "joining ratio" is 18 to 65% and the "maximum joining width" is 45 μm or less. Note that, the following has been separately confirmed: when the "joining ratio" is 18 to 65%, the tension strength at the interface is larger than that in the case where the "joining ratio" is not 18 to 65%.

In the test B (Table 2), although only the lanthanum chromite (LC) is used as the material for the interconnector, it has been confirmed that the same results as those in the case of using the LC are obtained also in the case of using the "titanium oxide" described in the section of "SUMMARY OF THE INVENTION."

From the above-mentioned contents and the results of Table 2, the following can be said: specifically, in the case where the LC or titanium oxide is used as the material for the interconnector, and La(Ni,Fe,Cu)O$_3$ is used as the material for the N-type semiconductor film, when the "joining ratio" is 18 to 65% and the "maximum joining width" is 45 μm or less, peeling is less liable to occur in the portion corresponding to the maximum joining width at the interface.

Note that, the present invention is not limited to the second embodiment, and various modified examples can be adopted within the scope of the present invention. For example, in the second embodiment, although a flow path for a fuel gas is not formed in the fuel electrode 110, the flow path for the fuel gas may be formed in the fuel electrode 110. In addition, although the laminate forming the SOFC 100 is present alone (see FIG. 4), the laminate may be present as a part of the entire apparatus.

Further, it is sufficient that the "maximum joining width be 45 μm or less" (and the joining ratio be 18 to 65%) only in any one cross-section including the interconnector and the N-type semiconductor film. Alternatively, it is necessary that the "maximum joining width be 45 μm or less" (and the joining ratio be 18 to 65%) in any plurality of cross-sections including the interconnector and the N-type semiconductor film (for example, two cross-sections parallel to a certain direction and two cross-sections parallel to a direction orthogonal to the certain direction).

What is claimed is:

1. A solid oxide fuel cell, comprising:
   a power generation part of the solid oxide fuel cell, comprising: a fuel electrode for allowing a fuel gas to be reacted by bringing the fuel gas into contact therewith; an electrolyte film made of a solid electrolyte provided on the fuel electrode; and an air electrode for allowing a gas containing oxygen to be reacted, the air electrode being provided on the electrolyte film so that the electrolyte film is sandwiched between the fuel electrode and the air electrode;
   an interconnector made of dense conductive ceramics and provided so as to be electrically connected to the fuel electrode;
   a porous conductive ceramics film formed on a surface of the interconnector,
   wherein a maximum joining width, which is a maximum value of lengths of a plurality of portions at which the interconnector and the porous conductive ceramics film are brought into contact with each other on a boundary line which is a line corresponding to an interface between the interconnector and the porous conductive ceramics film in a cross-section including the interconnector and the porous conductive ceramics film, is from 5 μm or more to 40 μm or less;
   and
   the porous conductive ceramics film is a P-type semiconductor film.

2. A solid oxide fuel cell according to claim 1, wherein a joining ratio, which is a ratio of a total of the lengths of the plurality of portions with respect to a length of the boundary line, is 21 to 75%.

3. A solid oxide fuel cell according to claim 2, wherein the joining ratio is no more than 50%.

4. A solid oxide fuel cell according to claim 1, wherein the interconnector is made of a lanthanum chromite represented by the following chemical formula:

$$La_{1-x}A_xCr_{1-y-z}B_yO_3$$

where A represents at least one kind of element selected from the group consisting of Ca, Sr, and Ba, B represents at least one kind of element selected from the group consisting of Co, Ni, Mg, and Al, a range of x is 0.05 to 0.2, a range of y is 0.02 to 0.22, and a range of z is 0 to 0.05.

5. A solid oxide fuel cell according to claim 1, wherein the interconnector is made of a titanium oxide represented by the following chemical formula:

$$(A_{1-x},Bx)_{1-z}(Ti_{1-y},Dy)O_3$$

where A represents at least one kind of element selected from the group consisting of alkaline earth elements, B represents at least one kind of element selected from the group consisting of Sc, Y, and lanthanoid elements, D represents at least one kind of element selected from the group consisting of fourth-period, fifth-period, and sixth-period transition metals and Al, Si, Zn, Ga, Ge, Sn, Sb, Pb, and Bi, a range of x is 0 to 0.5, a range of y is 0 to 0.5, and a range of z is −0.05 to 0.05.

6. A solid oxide fuel cell according to claim 1, further comprising a reaction prevention layer provided at a selected time between the electrolyte film and the air electrode, to prevent a reaction between yttria-stabilized zirconia in the electrolyte film and strontium in the air electrode.

7. A solid oxide fuel cell, comprising:
a power generation part of the solid oxide fuel cell, comprising: a fuel electrode for allowing a fuel gas to be reacted by bringing the fuel gas into contact therewith; an electrolyte film made of a solid electrolyte provided on the fuel electrode; and an air electrode for allowing a gas containing oxygen to be reacted, the air electrode being provided on the electrolyte film so that the electrolyte film is sandwiched between the fuel electrode and the air electrode;
an interconnector made of dense conductive ceramics and provided so as to be electrically connected to the fuel electrode;
a porous conductive ceramics film formed on a surface of the interconnector,
wherein a maximum joining width, which is a maximum value of lengths of a plurality of portions at which the interconnector and the porous conductive ceramics film are brought into contact with each other on a boundary line which is a line corresponding to an interface between the interconnector and the porous conductive ceramics film in a cross-section including the interconnector and the porous conductive ceramics film, is 45 µm or less; and
the porous conductive ceramics film is a N-type semiconductor film.

8. A solid oxide fuel cell according to claim 7, wherein a joining ratio, which is a ratio of a total of the lengths of the plurality of portions with respect to a length of the boundary line, is 18 to 65%.

* * * * *